(No Model.) 2 Sheets—Sheet 1.

T. M. KENNA.
TROLLEY TRUCK.

No. 587,738. Patented Aug. 10, 1897.

WITNESSES:
F. Philip Farnsworth.
Samuel Alfred J.

INVENTOR
Thomas M. Kenna
BY Robinson Fisher
ATTORNEY.

(No Model.) 2 Sheets—Sheet 2.
T. M. KENNA.
TROLLEY TRUCK.
No. 587,738. Patented Aug. 10, 1897.
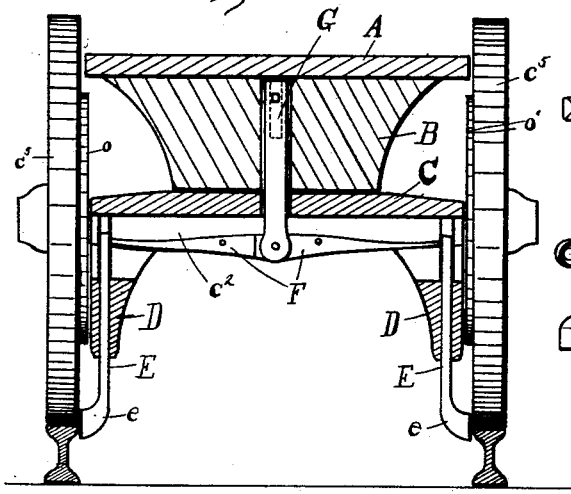
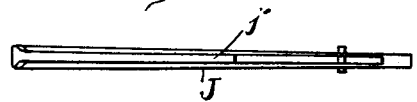
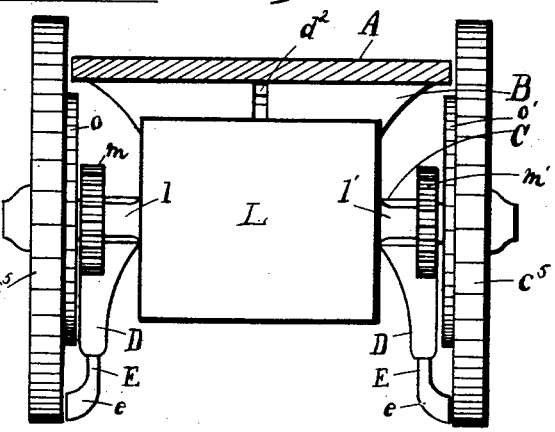
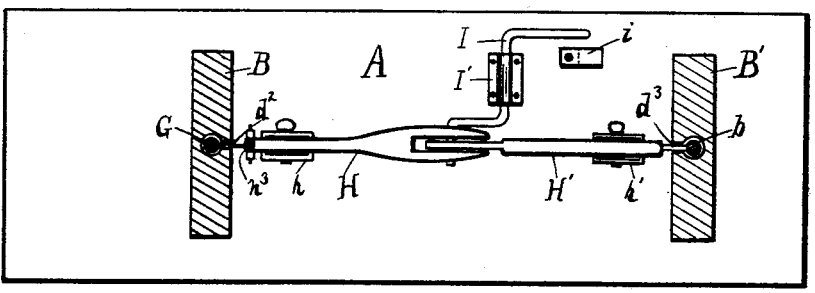
WITNESSES:
INVENTOR
Thomas M. Kenna
BY
Robinson Fish
ATTORNEYS.

UNITED STATES PATENT OFFICE.

THOMAS M. KENNA, OF NEW HAVEN, CONNECTICUT.

TROLLEY-TRUCK.

SPECIFICATION forming part of Letters Patent No. 587,738, dated August 10, 1897.

Application filed May 16, 1896. Serial No. 591,809. (No model.)

*To all whom it may concern:*

Be it known that I, THOMAS M. KENNA, a citizen of the United States, and a resident of the city and county of New Haven, State of Connecticut, have invented a new and useful Improvement in Trolley-Trucks, fully set forth in the following specification, taken in connection with the drawings which form a part thereof, and in which—

Figure 1:
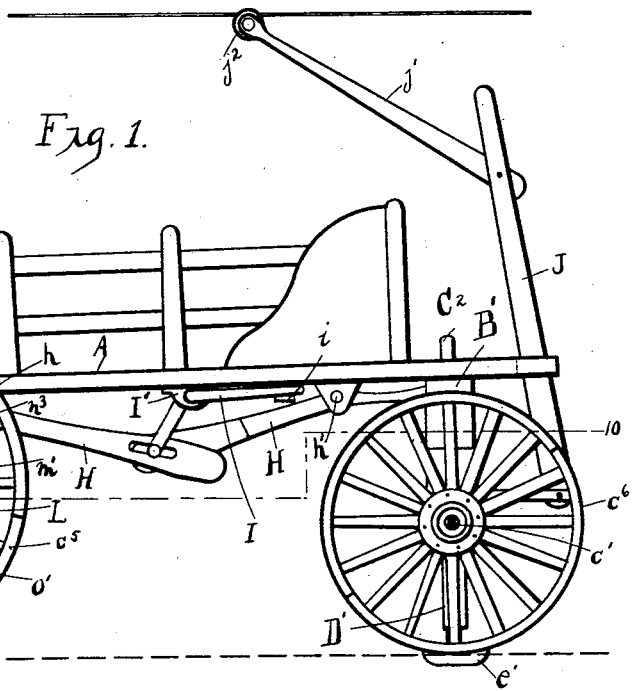
Figure 2:
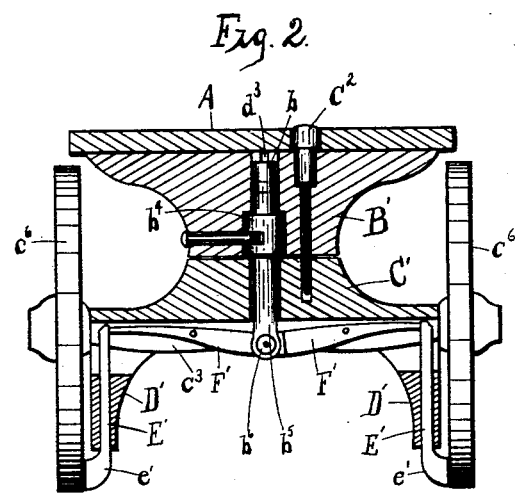
Figures 3, 4:
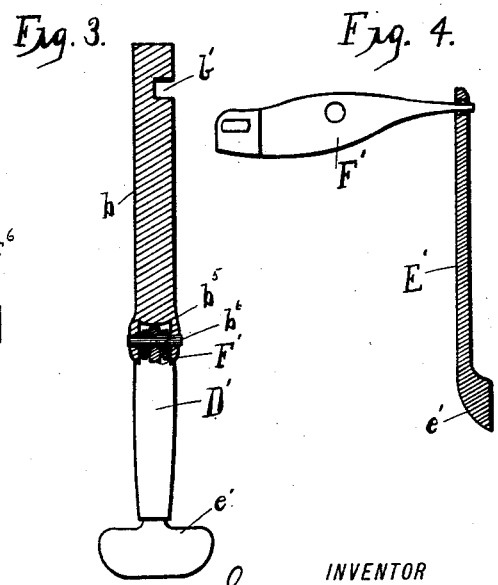

Figure 1 is a side elevation of a truck embodying my invention. Fig. 2 is a transverse vertical section through the fore standard and axle. Fig. 3 is a detail sectional view through the vertical rod in the fore standard. Fig. 4 is a detail view of one of the transverse levers. Fig. 5 is a transverse vertical section through the rear standard and axle. Fig. 6 is a top view of the pole. Fig. 7 is a view of the pole and arm folded. Fig. 8 is a transverse section through the bed of the truck, showing the motor-box and driving-shafts. Fig. 9 is a detail view of the driving-shafts and mechanism for operating them longitudinally. Fig. 10 is a horizontal section on the lines 10 10 of Fig. 1, showing the bottom of the bed of the truck.

In all figures similar letters of reference represent like parts.

This invention relates to trolley-trucks, and more particularly to the making of a truck or car the wheels of which are fitted with independent flanges adapted to be raised or lowered at will to make a flanged or flangeless wheel.

The object of this invention is to produce a novel truck or car which may be adapted for use as an ordinary truck propelled by horses or converted into a truck or car adapted to be propelled on tracks by electricity, as the user may desire, by means of levers, movable flanges, trolley-pole, motor, &c., as is hereinafter fully described.

In the drawings, A represents the bed or box of the truck, and B and B' the rear and fore standards, respectively. Axles C and C', having the axle-arms $c$ and $c'$, are secured to the standards B and B', and wheels $c^5$ and $c^6$ are mounted on said arms. Vertical hollow arms D and D' are formed integral with or secured to the under sides of the axles C and C' at the outer ends of said axles proper.

The axles C and C' are cut away on their under sides to form grooves $c^2$ and $c^3$.

Vertical plungers E and E' are adapted to pass through and have a limited vertical play in the arms D and D', and have formed integral with their lower ends vertical disks or plates $e$ and $e'$, which are adapted to form flanges to the wheels, while their upper ends are pivoted to transverse levers F and F', fitting in the grooves $c^2$ and $c^3$ in the axles C and C', and have a limited vertical swing therein.

The king-pin $b^4$, which unites the front axle C' and standard B', is hollowed axially, and through the king-pin and circular vertical perforations in the axle C' and standard B' extends a vertical rod $b$. At the lower end of rod $b$ is a spreader $b^5$ with a bolt $b^6$, which passes through slots in the inner ends of the transverse levers F'. Said rod $b$ has a transverse groove $b'$ at its upper end, which groove is adapted to receive the end of a longitudinal lever hereinafter described. A corresponding vertical rod G passes through a circular perforation in the rear axle C and standard B and is connected at its lower end to the inner ends of the transverse levers F in a manner similar to the connection in the forward axle.

Two longitudinal levers H and H' are pivoted in the blocks $h$ and $h'$, secured to the under side of the bed A, and the outer ends thereof enter the standards B and B' through slots $d^2$ and $d^3$. The lever H being connected to the vertical rod G in the rear standard B and the lever H' fitting into the groove $b'$ of the rod $b$ permits of a vertical movement of the rods G and $b$, while admitting of a limited circular movement of the rod $b$. Thus the axle C' is allowed to swing on the standard B'.

An operating-lever I is secured to the under side of the bed A by a housing I', in which said lever I is loosely mounted. The inner end of said operating-lever passes through slots in the inner ends of the levers H and H', the ends of which meet near the center of said bed A, as shown in Figs. 1 and 10.

A button $i$, attached to the under side of the bed A, is adapted to secure the outer end or handle of the lever I when desired.

A pin C² is adapted to pass through a circular perforation in the bed A, standard B', and enter the axle C' a short distance to prevent the swinging of the axle on the standard by holding said axle rigid when desired.

A pole J is secured to the front of the axle C' in any suitable manner, said pole having an arm j pivoted near its free end. The pole J is provided with a recess j', which permits the arm j to be folded upon said pole J, as shown in Fig. 7. The free end of the arm j is adapted to receive a trolley-wheel j².

A housing L for a motor, having hollow cylindrical arms l and l' extending transverse therefrom, is secured to the axle C, as shown in Fig. 1.

A sleeve L' is secured in the housing L and rotated by the motor in any suitable manner.

Shafts M and M' pass through the cylindrical arms l and l' and extend into the sleeve L', to which they are keyed to rotate with said sleeve, at the same time being allowed a limited longitudinal movement therein. (See Fig. 9.) The outer ends of said shafts M and M' are provided with cog-wheels m and m', adapted to mesh with internally-geared rings o and o' on the rear wheel. A T-shaped lever N is fulcrumed at n to the housing L, and has connected to the ends n' and n² transverse rods S, the other ends of which are secured to the shafts M and M', as shown in Fig. 9. To the end of said lever N is pivoted a vertical rod n³, the upper end of which is connected to the lever H.

The motor, pole, &c., are wired in any well-known manner for electrical connection.

In operation when the truck is to be converted into a trolley-truck, propelled on the track by electricity, the free end of the operating-lever I is forced toward the bed A of the truck and fastened thereto by the button i. By the connection of said lever with the inner ends of the levers H and H' said ends are forced downward, which in turn forces the outer ends of said levers upward, thus drawing the rods G and b upward. The lower ends of said rods G and b, being pivoted to the inner ends of the transverse levers F and F', draw them upward, forcing the outer ends of said levers, which are pivoted to the plungers E and E', downward. As the plungers are forced downward the flanges secured thereto, which normally are raised above the running edge of the wheel-tire, are forced below the edge of the wheel to engage with the rails of the track, Figs. 1 and 5. The forcing upward of the outer end of the lever H also forces the rod n³ upward, causing the lever N to be rotated on its pivot. The rotation of the lever N forces the rods n and n' and the shafts M and M' outward, so that the gear-wheels at their outer ends mesh with the internal gearing on the wheels c⁵. The pole J is then unfolded and raised to an upright position until the trolley-wheel engages with the wire. The pin C² is then engaged with the axle C' to hold the front wheels rigid. To operate the truck by horses, the reverse movement of the operating-lever I, through its connections, draws the flanges e and e' above the running edge of the wheels, and through the rod n³ reverses the movement of the lever n and draws the shafts with the gear-wheels m and m' out of connection with the internal gears o and o' on the wheels.

The arm of the pole J may be lowered and folded for use as the ordinary pole of a wagon, and the pin C², being disengaged from the front axle C', allows said axle to again turn on its pivot.

The details of construction of this device may vary greatly without departing from the spirit of the invention; but

What I claim, and desire to secure by Letters Patent, is—

1. In a truck or other vehicle, the combination with the wheels thereof; of hollow arms depending from the axles of said wheels; vertical plungers adapted to have a limited vertical play in said arms; plates secured to the lower ends of said plungers to form flanges for the wheels when desired; and mechanism for operating said plungers, substantially as described.

2. In a truck or other vehicle, the combination with the wheels thereof; of the axle of said wheels; hollow arms depending from said axle; plungers adapted to have a limited play in said arms; plates secured to the lower ends of said plungers to form flanges for said wheels when desired; transverse levers pivoted to said axle to swing in a vertical plane, and having their outer ends connected with said plungers; a vertical rod, the lower end of which is pivotally connected to the inner ends of said transverse levers; and mechanism for operating the same, substantially as described.

3. In a truck or other vehicle, the combination with the wheels thereof; of the fore and rear axles of said wheels; hollow arms depending from said axles; plungers adapted to have a limited play in said arms; plates secured to the lower ends of said plungers to form flanges for said wheels when desired; transverse levers pivoted to said axles to swing in a vertical plane, and having their outer ends connected with said plungers; vertical rods, the lower ends of which are pivotally connected to the inner ends of said transverse levers; longitudinal levers, the outer ends of which are attached to said vertical rods; an operating-lever pivoted to the bed of said truck having one end attached to the inner ends of said longitudinal levers, substantially as described.

4. In a truck or other vehicle the combination with a recessed pole; of an arm having a trolley-wheel at one end thereof and being pivotally connected at the other end to the end of said pole, and adapted to fold into said recessed part when not in use, substantially as described.

5. In a truck or other vehicle the combination with the bed thereof; the fore standard of said truck; an axle attached to said standard; and a pin adapted to pass through perforations in said standard and into said axle to hold said axle rigid when desired, substantially as described.

6. In a truck or other vehicle, the combination with the wheels thereof; of two driving-shafts in a line with each other and capable of being drawn toward each other and forced apart, and adapted when so forced apart to be connected to said wheels to operate the same; an electric motor for operating said shafts; and mechanism for drawing said shafts toward each other and forcing them apart as desired, substantially as described.

7. In a truck or other vehicle the combination with the wheels thereof; of adjustable plates adapted to form flanges for the wheels; gears on the wheels; transverse shafts capable of a rotary and a limited longitudinal movement, and having gears on their outer ends adapted to mesh with the gears on the wheels; an electric motor; means for rotating said shafts from said motor; and mechanism for operating said adjustable plates and giving said shafts their longitudinal motion simultaneously, substantially as described.

In witness whereof I have hereunto set my hand, at New Haven, in the county of New Haven, State of Connecticut, this 11th day of May, 1896.

THOMAS M. KENNA.

Witnesses:
GEORGE W. ROBINSON,
F. PHILIP FARNSWORTH.